United States Patent [19]
Laarman

[11] Patent Number: 5,904,342
[45] Date of Patent: May 18, 1999

[54] LANDING GEAR CRANK HANDLE

[75] Inventor: Gregory A. Laarman, Holland, Mich.

[73] Assignee: Holland Hitch Company, Holland, Mich.

[21] Appl. No.: 09/042,700

[22] Filed: Mar. 17, 1998

[51] Int. Cl.[6] .................................................. B60S 9/02
[52] U.S. Cl. ........................ 254/419; 254/424; 254/420; 74/548; 16/111 R
[58] Field of Search ..................... 254/419, 425, 254/420, 424, 98; 74/523, 525, 528, 543–548; 16/111 R; 403/61, 59

[56] References Cited

U.S. PATENT DOCUMENTS

| | | | |
|---|---|---|---|
| 1,519,166 | 12/1924 | Rauch | 74/543 |
| 1,927,326 | 9/1933 | Walker . | |
| 1,930,802 | 10/1933 | Hamilton . | |
| 2,140,617 | 12/1938 | Castady . | |
| 2,570,183 | 10/1951 | Weber . | |
| 3,027,140 | 3/1962 | Holzbach . | |
| 3,174,358 | 3/1965 | Wachta | 74/548 |
| 3,313,505 | 4/1967 | Petrie . | |
| 3,398,933 | 8/1968 | Haroldson . | |
| 3,632,086 | 1/1972 | Mai . | |
| 3,642,243 | 2/1972 | Eugene . | |
| 3,738,613 | 6/1973 | Hollis, Jr. | 254/420 |
| 3,861,648 | 1/1975 | Glassmeyer . | |
| 4,923,175 | 5/1990 | Bentrup . | |
| 5,157,882 | 10/1992 | Solbe | 403/61 |
| 5,277,405 | 1/1994 | McSwain . | |
| 5,301,389 | 4/1994 | Engel et al. | 74/528 |
| 5,423,518 | 6/1995 | Baxter et al. | 254/425 |
| 5,542,647 | 8/1996 | Huetsch . | |
| 5,771,535 | 6/1998 | Blessing | 16/111 R |

FOREIGN PATENT DOCUMENTS 116519   9/1929   Austria .

Primary Examiner—David A. Scherbel
Assistant Examiner—Lee Wilson
Attorney, Agent, or Firm—Price, Heneveld, Cooper, DeWitt and Litton

[57] ABSTRACT

A landing gear crank handle for raising and lowering vehicle landing gear is provided that includes a first hand hold that is horizontal when the handle is in a full extended position, a second hand hold connected to the first hand hold by a central portion, and an arm connected to the first hand hold; and a jaw connector attached to the arm and adapted to connect the crank handle to a landing gear crank mechanism and adapted to allow the crank handle to lock into a collapsed position, a partially extended position, and a full extended position.

20 Claims, 2 Drawing Sheets

US 5,904,342

LANDING GEAR CRANK HANDLE

BACKGROUND OF THE INVENTION

The present invention relates to crank handles for trailer landing gear assemblies.

Landing gear assemblies for semitrailers and the like use a cranking system with a handle which can be locked either in a storage position or in an extended standard position whereby the handle can be used to crank the landing gear up or down. The handle displayed in U.S. Pat. No. 5,423,518 is indicative of the kind of handle that has been used with landing gear cranking systems for a number of years. Although this type of handle works very well for the low-speed, high-torque situation when the trailer contains a heavy load, it does not allow the user to maximize the high-speed gear when extending and retracting the legs from the stored (retracted) position to the extended position (when the foot makes contact with the ground). The user is restricted because of the distance the handle must travel to make a single revolution.

Many landing gear crank systems today for semitrailers or the like use a two-speed system, with a high speed for lower weight load and a low speed for higher torque with a heavy load. Such a system is shown in U.S. Pat. No. 3,632,086. Again, the handle previously used does not allow maximum cranking speed under no load, even when the high-speed gear is used.

Accordingly, it is a desire of the semitrailer industry to have a handle that permits faster cranking speed when the crank is used under no load to maximize use of the high-speed gear in landing gear crank systems.

SUMMARY OF THE INVENTION

One aspect of the present invention is a crank handle for raising and lowering vehicle landing gear, the crank handle comprising a first hand hold that is horizontal when the handle is in a full extended position, a second hand hold connected to the first hand hold by a central portion, and an arm connected to the first hand hold; and a jaw connector attached to the arm and adapted to connect the crank handle to a landing gear crank mechanism and adapted to allow the crank handle to lock into a collapsed position, a partially extended position, and a full extended position.

Another aspect of the present invention is a crank handle for raising and lowering vehicle landing gear, the crank handle comprising a first hand hold that is horizontal when the handle is in a fully extended position, a second hand hold connected to the first hand hold by a central portion, a third hand hold extending from the second hand hold, the third hand hold being horizontal when the handle is in a partially extended position, and an arm connected to the first hand hold.

Yet another aspect of the present invention is a crank system for raising and lowering landing gear, the crank system comprising a cranking mechanism which has a variable speed drive mechanism; and a crank handle comprising a first hand hold that is horizontal when the handle is in a fully extended position, a second hand hold connected to the first hand hold by a central portion, a third hand hold extending from the second hand hold, the third hand hold being horizontal when the handle is in a partially extended position, and an arm connected to the first hand hold.

Still another aspect of the present invention is a trailer landing gear assembly comprising one or more telescopic leg assemblies, a gear box operably engaged with one of the telescopic legs by an output shaft, an input shaft connected to the gear box, and a crank handle connected to the input shaft, the crank handle comprising a first hand hold that is horizontal when the handle is in a fully extended position, a second hand hold connected to the first hand hold by a central portion, a third hand hold extending from the second hand hold, the third hand hold being horizontal when the handle is in a partially extended position, and an arm connected to the first hand hold.

The advantage of this invention becomes apparent when considering that the landing gear leg must be cranked approximately 10–12 inches to both extend and retract, whereas it is cranked only 1–2 inches under load.

These and other features, advantages and objects of the present invention will be further understood and appreciated by those skilled in the art by reference to the following specification, claims and appended drawings.

DETAILED DESCRIPTION OF THE PREFERRED EMBODIMENTS

Referring now specifically to the drawings, landing gear assembly typically comprises a pair of like landing gear legs, a gear box adjacent one of these legs, an input drive shaft to the gear box, a hand crank, and a cross shaft to the second leg.

Figure 1:
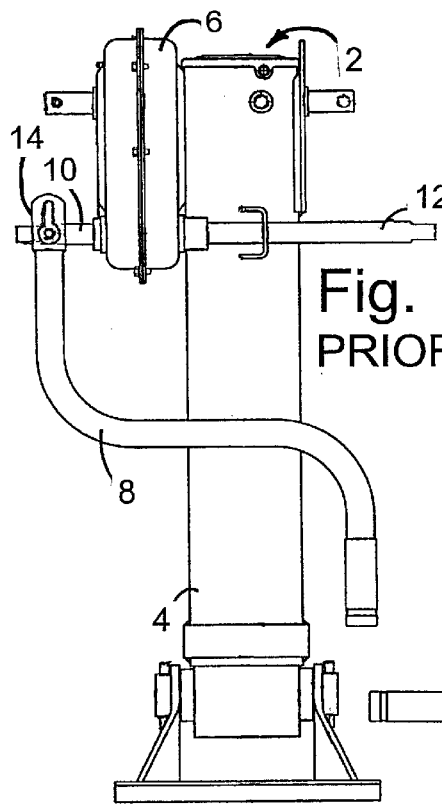
FIG. 1 is an elevational view of landing gear with a prior art handle in the collapsed position.
Figure 2:
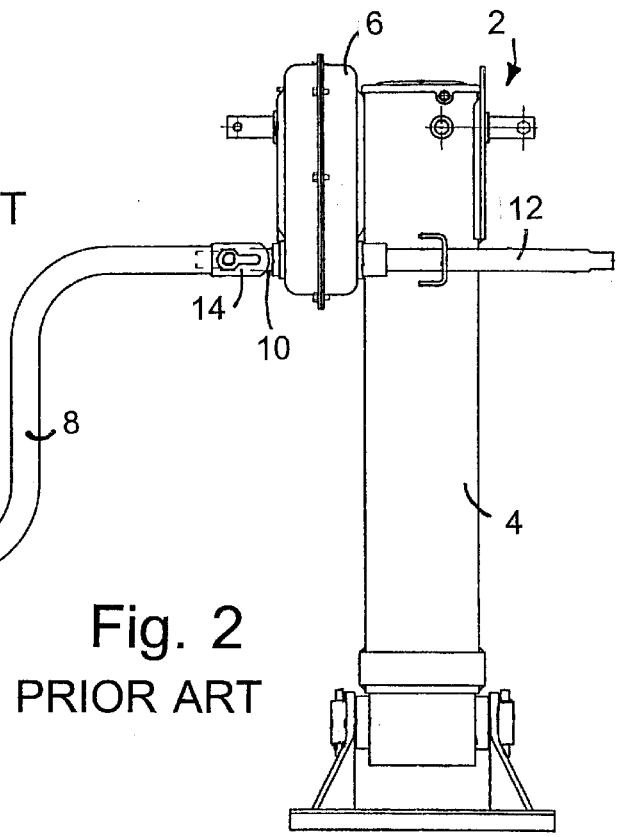
FIG. 2 is an elevational view of landing gear with a prior art handle in the extended position.

More specifically, FIGS. 1 and 2 show a typical landing gear assembly with a prior art crank handle. The single leg assembly 2 depicted in the drawings includes a telescopic leg 4, and a conventional gear box 6, usually two-speed, which is actuated by crank handle 8 through an input shaft 10. An output shaft 12 can connect to a cross shaft (not shown) to the second leg (not shown) in conventional fashion.

The prior art crank handle 8 generally has an "S" shape and is approximately sixteen inches from top to bottom as shown in FIG. 2. The prior art crank handle 8 is equipped with a two-way connector 14, which allows the crank handle 8 to be locked in a collapsed (stored) position, as shown in FIG. 1, or in an extended (standard) position as shown in FIG. 2. Thus, the prior art crank handle 8 is only capable of one useful position (FIG. 2), which can be burdensome to use when little or no load in the semitrailer permits easy cranking. The user in such a case is limited by the distance that the handle must be turned to make one rotation of the input shaft 10.

Figure 3:
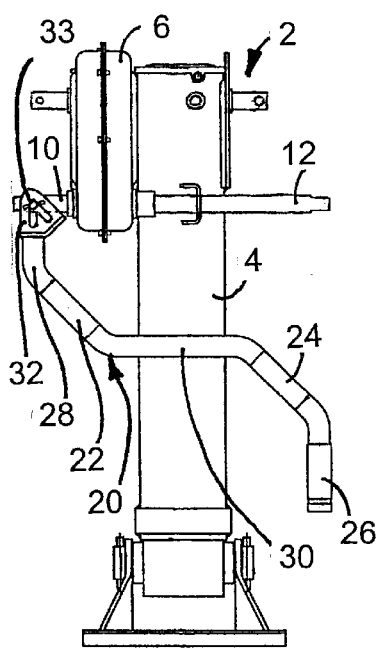
FIG. 3 is an elevational view of landing gear with a speed crank handle of the present invention in the collapsed position.
Figure 4:
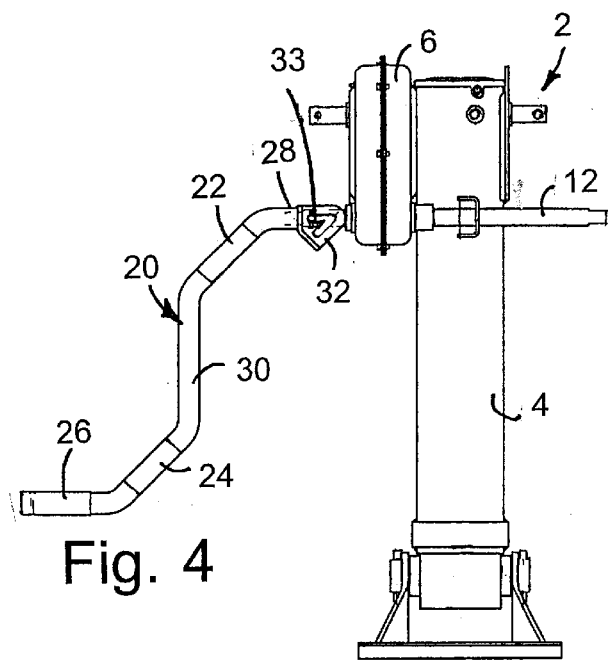
FIG. 4 is an elevational view of landing gear with a speed crank handle of the present invention in the partially extended position.

The present invention, shown in FIGS. 3–6, is a landing gear assembly shown as a conventional leg assembly 2, which includes telescopic legs 4, a gear box 6, and a unique crank handle 20. Gear box 6 is actuated by crank handle 20 through input shaft 10. Crank handle 20 includes a first hand hold 22, a second hand hold 24, a third hand hold 26, an arm 28, a central portion 30, and a jaw connector 32, which is connected to input shaft 10 by a pin 33. First hand hold 22 and second hand hold 24 are preferably parallel to each other and are preferably at a 135° angle to the third hand hold 26, the arm 28, and the central portion 30, although use of other relative angles is contemplated. Crank handle 20 is preferably approximately sixteen inches from top (at arm 28) to bottom (at hand hold 26) as the handle is shown in FIG. 4.

Jaw connector 32 allows the crank handle 20 to be locked into three positions. First, the jaw connector 32 allows the crank handle to be locked in the collapsed (stored) position (FIG. 3). This position allows the handle 20 to remain out of the way while it is not in use. Second, the crank handle 20 may be locked into the partially extended (standard) position (FIG. 4). This position is used when there is a significant load in the semitrailer, creating a high torque on the gear box and thus requiring a low speed of cranking. Hand hold 26 is used in the high-load situation. Crank handle 20 generally has an "S" shape so that using hand hold 26 will work in substantially the same manner as the prior art handle 8 for the high load, low speed situation.

Figure 5:
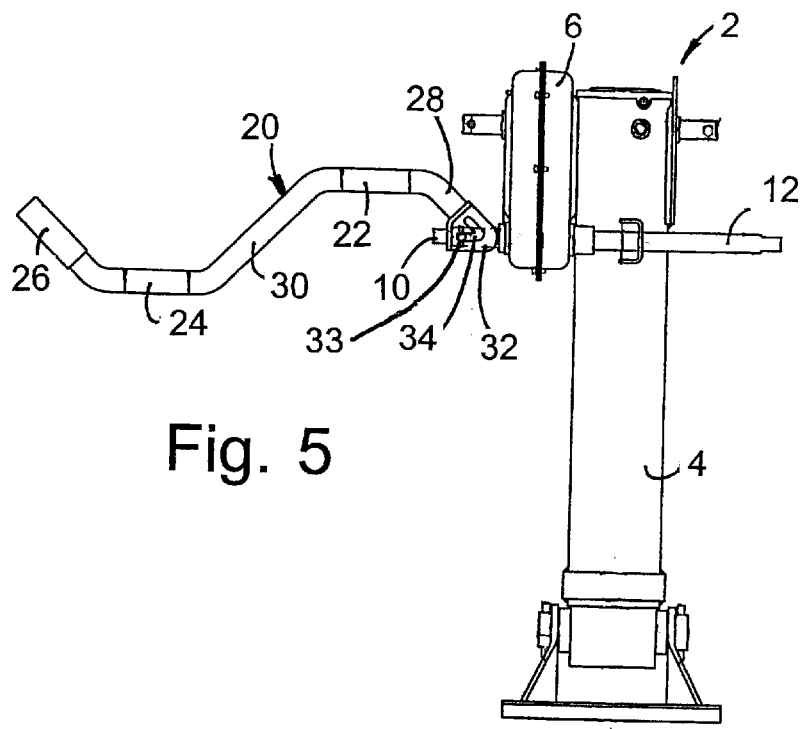
FIG. 5 is an elevational view of landing gear with a speed crank handle of the present invention in the fully extended position.
Figure 6:
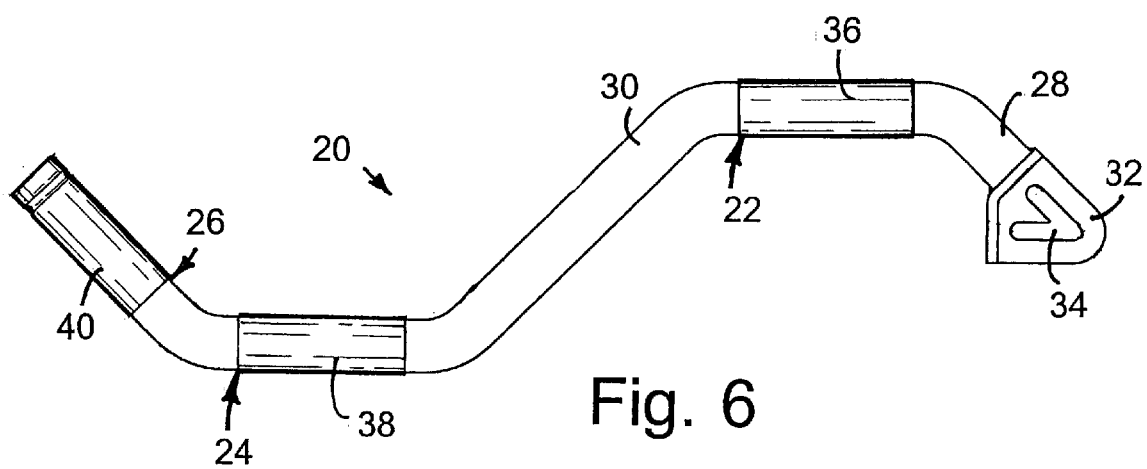
FIG. 6 is an elevational view of the speed crank equipped with hand hold sleeves.

The third position is the fully extended (high-speed) position (FIG. 5). This position is utilized when there is little or no load in the semitrailer, thus allowing high-speed cranking. Hand holds 22 and 24 can be utilized for high-speed cranking which cuts the time it takes to crank the landing gear up or down. Hand holds 22 and 24, when in the fully extended position, are both parallel to the longitudinal axis of input shaft 10, as well as to each other. The offset of hand holds 22 and 24 from input shaft 10 in the fully extended position is approximately one-fourth of the offset of hand hold 26 when crank handle 20 is in the partially extended position. The positioning of the handles thus creates a smaller travel distance for hand holds 22 and 24 compared to the low-speed situation described above, and handle 20 allows use of both hands to perform the high-speed cranking. Crank handle 20 of the present invention as shown in FIGS. 3–6 is preferably interchangeable with the prior art crank handles. The unique crank handle greatly reduces operating time for raising and lowering landing gear when there is little or no load present in the trailer.

Jaw connector 32 has a V-shaped slot 34 that has a 45° angle which allows the crank handle 20 to grip the input shaft 10 in two different positions. One such position is the standard position (FIG. 4) where the arm 28 and hand hold 26 are parallel to input shaft 10. The other is the high-speed, fully extended position (FIG. 5) where, although arm 28 is at an angle to the input shaft 10, the V-shaped slot 34 of jaw connector 32 allows the rotation of the crank handle 20 to be efficiently translated to rotation of the input shaft 10. The crank handle of the present invention may have rubber or plastic sleeves 36, 38, and 40 (FIG. 6) on hand holds 22, 24, and 26, respectively, to ensure a good grip by the hands of the user.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A crank handle for raising and lowering vehicle landing gear, the crank handle comprising:
   a first hand hold that is horizontal when the handle is in a fully extended position;
   a second hand hold connected to the first hand hold by a central portion;
   an arm connected to the first hand hold; and
   a jaw connector attached to the arm and adapted to connect the crank handle to a landing gear crank mechanism and adapted to allow the crank handle to move to a collapsed position, said jaw connector having a first lock connection oriented to cause said crank handle to lock into a partially extended position, and having a second lock connection oriented to cause said crank handle to lock into a fully extended position, the crank handle in the fully extended position being at an angle of about 45° relative to the crank handle in the partially extended position.

2. The crank handle defined in claim 1 wherein the first hand hold and the second hand hold are parallel to each other and offset from each other.

3. The crank handle defined in claim 2 and further comprising a third hand hold extending from the second hand hold and that is horizontal when the crank handle is in a partially extended position.

4. The crank handle defined in claim 3 and further comprising a hand hold sleeve covering at least one hand hold.

5. The crank handle defined in claim 4 wherein the first and second hand holds are both at about a 135° angle relative to the third hand hold.

6. A crank handle for raising and lowering vehicle landing gear, the crank handle comprising:
   a first hand hold that is horizontal when the handle is in a fully extended position;
   a second hand hold connected to the first hand hold by a central portion;
   a third hand hold extending from the second hand hold, the third hand hold being horizontal when the handle is in a partially extended position and at an angle to the first and second hand holds; and
   an arm connected to the first hand hold that is adapted to receive a shiftable connector for connection to an input shaft of a landing gear crank mechanism.

7. The crank handle defined in claim 6 and further comprising a jaw connector attached to the arm and adapted to connect the crank handle to a landing gear crank mechanism and adapted to allow the crank handle to lock onto a pin attached to the landing gear crank mechanism in a partially extended position, and a fully extended position.

8. The crank handle defined in claim 7 wherein the first hand hold and the second hand hold are parallel to each other.

9. The crank handle defined in claim 8 and further comprising a hand hold sleeve covering at least one hand hold.

10. The crank handle defined in claim 9 wherein the first and second hand holds are at about a 135° angle relative to the third hand hold.

11. A crank system for raising and lowering landing gear, the crank system comprising:
   a variable speed drive mechanism; and
   a crank handle comprising:
      a first hand hold that is horizontal when the handle is in a fully extended position;

a second hand hold connected to the first hand hold by a central portion;

a third hand hold extending from the second hand hold, the third hand hold being horizontal when the handle is in a partially extended position; and an arm connected to the first hand hold and operably engaged with the drive mechanism.

12. The crank handle defined in claim 11 and further comprising a jaw connector attached to the arm and adapted to connect the crank handle to a landing gear crank and adapted to allow the crank handle to lock onto a pin attached to the landing gear crank mechanism in a partially extended position, and a fully extended position.

13. The crank handle defined in claim 12 wherein the first hand hold and the second hand hold are parallel to each other.

14. The crank handle defined in claim 13 and further comprising hand hold sleeves covering at least one hand hold.

15. The crank handle defined in claim 14 wherein the first and second hand holds are at about a 135° angle relative to the third hand hold.

16. A trailer landing gear assembly comprising:

at least one telescopic leg assembly;

a gear box operably engaged with said telescopic leg assembly by an output shaft;

an input shaft connected to the gear box; and a crank handle connected to the input shaft, the crank handle comprising:

a first hand hold that is horizontal when the handle is in a fully extended position;

a second hand hold connected to the first hand hold by a central portion;

a third hand hold extending from the second hand hold, the third hand hold being horizontal when the handle is in a partially extended position; and an arm connected to the second hand hold and the input shaft.

17. A semi-trailer landing gear crank handle comprising:

an elongated crank handle having a shiftable connector for selective connection to a landing gear input shaft;

said connector having first and second alternative shaft connection positions at an angle to each other, and a handle collapse position;

said handle having a first hand hold parallel to and offset from said first shaft connection position, and a second hand hold parallel to and offset from said second shaft connection position;

said offset of said first hand hold being a fraction of said offset of said second hand hold, whereby said handle operated with said first hand hold can be operated more rapidly than said handle operated with said second hand hold.

18. The semi-trailer landing gear crank handle of claim 17, including a third hand hold offset from and parallel to said first hand hold for operation of said crank handle with both hands.

19. The semi-trailer landing gear crank handle of claim 17 wherein said first and second hand holds are at an angle to each other aligned respectively with said first and second shaft connection positions of said connector.

20. The semi-trailer landing gear crank handle of claim 19, wherein said connector position angle is about 45° and said hand hold angle is about 135°.

* * * * *